United States Patent
Baum et al.

(10) Patent No.: US 10,442,256 B2
(45) Date of Patent: Oct. 15, 2019

(54) SYSTEM FOR TIRE PRESSURE MONITORING FOR A UTILITY VEHICLE

(71) Applicant: Deere & Company, Moline, IL (US)

(72) Inventors: Bernd Baum, Dannstadt-Schauernheim (DE); Florian Schott, Bensheim (DE); Florian Reinmuth, Sinsheim (DE)

(73) Assignee: Deere & Company, Moline, IL (US)

( * ) Notice: Subject to any disclaimer, the term of this patent is extended or adjusted under 35 U.S.C. 154(b) by 66 days.

(21) Appl. No.: 15/442,957

(22) Filed: Feb. 27, 2017

(65) Prior Publication Data

US 2017/0253094 A1    Sep. 7, 2017

(30) Foreign Application Priority Data

Mar. 7, 2016   (DE) .................. 10 2016 203 685

(51) Int. Cl.
*B60C 23/04*    (2006.01)
*B60C 23/00*    (2006.01)

(52) U.S. Cl.
CPC ........ *B60C 23/0484* (2013.01); *B60C 23/003* (2013.01); *B60C 23/0401* (2013.01)

(58) Field of Classification Search
CPC ..... B60C 23/00; B60C 23/001; B60C 23/003; B60C 23/02; B60C 23/04; B60C 23/0401; B60C 23/0484
See application file for complete search history.

(56) References Cited

U.S. PATENT DOCUMENTS

| | | | |
|---|---|---|---|
| 4,860,579 A | 8/1989 | Beverly | |
| 5,180,456 A * | 1/1993 | Schultz | B60C 23/003 141/1 |
| 6,250,327 B1 * | 6/2001 | Freigang | B60C 23/003 137/225 |

(Continued)

FOREIGN PATENT DOCUMENTS

| | | |
|---|---|---|
| EP | 0343990 A2 | 11/1989 |
| EP | 2021194 B1 | 2/2009 |

(Continued)

OTHER PUBLICATIONS

German Search Report in foreign counterpart application No. 102016203685.8 dated Oct. 10, 2016 (8 pages).

(Continued)

*Primary Examiner* — Kip T Kotter

(57) ABSTRACT

A system for monitoring tire pressure of at least one vehicle tire of a utility vehicle includes a pressure sensor for detecting an internal tire pressure of the at least one vehicle tire and an electrically controllable tire inflation system for varying the internal tire pressure. The system also includes a monitoring unit disposed in communication with the pressure sensor and the tire inflation system. The monitoring unit identifies a defect-induced loss of pressure in the at least one vehicle tire based on the detected internal tire pressure, determines a temporal progression of the detected defect-induced loss of pressure, calculates a volume flow necessary for continuous compensation of the pressure loss based on the temporal progression, and controls the volume flow into the at least one vehicle tire via the tire inflation system.

7 Claims, 2 Drawing Sheets

(56) References Cited

U.S. PATENT DOCUMENTS

| | | | |
|---|---|---|---|
| 6,561,107 B1* | 5/2003 | Wood | A47B 3/0812 |
| | | | 108/132 |
| 6,666,078 B1* | 12/2003 | Claussen | B60C 23/003 |
| | | | 73/146 |
| 2009/0223615 A1 | 9/2009 | Isono | |
| 2013/0335214 A1 | 12/2013 | Massey et al. | |
| 2015/0101701 A1* | 4/2015 | Dean | B60C 23/003 |
| | | | 141/4 |
| 2017/0080761 A1* | 3/2017 | King | B60C 23/003 |
| 2017/0087944 A1* | 3/2017 | King | B60C 23/003 |
| 2017/0113498 A1* | 4/2017 | King | B60C 23/002 |
| 2018/0170125 A1* | 6/2018 | Woodley | B60C 23/003 |
| 2018/0178598 A1* | 6/2018 | Woodley | B60C 23/003 |

FOREIGN PATENT DOCUMENTS

| | | | | |
|---|---|---|---|---|
| EP | 2066505 B1 | 12/2013 | | |
| GB | 2539258 A | * 12/2016 | | B60C 23/003 |

OTHER PUBLICATIONS

European Search Report in foreign counterpart application No. 17158417.0 dated Jun. 28, 2017 (7 pages).

\* cited by examiner

SYSTEM FOR TIRE PRESSURE MONITORING FOR A UTILITY VEHICLE

RELATED APPLICATIONS

This application claims the benefit of German Application Ser. No. 102016203685.8, filed on Mar. 7, 2016, the disclosure of which is hereby expressly incorporated by reference in its entirety.

FIELD OF THE DISCLOSURE

The present disclosure relates to a utility vehicle, and in particular to a system for tire inflation pressure monitoring for the utility vehicle.

BACKGROUND

A conventional system for commercial vehicles includes a microprocessor-controlled monitoring unit in which a central tire inflation system periodically queries the internal tire pressure prevailing in the associated vehicle tires and, upon recognition of an excessive pressure drop, infers a defect-induced leakage in one or more of the vehicle tires. In such a case, the central tire inflation system attempts to restore the original internal tire pressure in the vehicle tire or tires affected by the defect. At the same time, a visual signal indicating the performance of a corresponding re-inflation process is output.

If leakage and a further pressure drop caused thereby persist, the re-inflation process is repeated. Fluctuations of the internal tire pressure can occur due to inflation pauses and therefore unusual driving behavior of the utility vehicle can occur that hampers further travel.

A need therefore exists for an improved system for monitoring tire pressure for a commercial vehicle.

SUMMARY

In one embodiment of the present disclosure, a system for tire inflation pressure monitoring for a utility vehicle includes at least one vehicle tire, wherein a pressure sensor for detecting an internal tire pressure is associated with the at least one vehicle tire; an electrically controllable tire inflation system for varying the internal tire pressure; and a control unit communicating with the pressure sensor and the tire inflation system, wherein the control unit identifies a defect-induced loss of pressure in the at least one vehicle tire on the basis of the detected internal tire pressure.

In another embodiment, a system for tire pressure monitoring for commercial vehicle includes at least one vehicle tire, wherein a pressure sensor for detecting the internal tire pressure is associated with the at least one vehicle tire. In addition, an electrically controllable tire inflation system for varying the internal tire pressure and a monitoring unit connected to the pressure sensor and the tire inflation system are provided, wherein the monitoring unit identifies a defect-induced loss of pressure in the at least one vehicle tire on the basis of the detected internal tire pressure. According to the disclosure, the monitoring unit determines a temporal progression of the detected defect-induced loss of pressure in a return-home mode. Based on the determined temporal progression, the monitoring unit calculates a volume flow necessary for continuous compensation of the pressure loss and adjusts it in the at least one vehicle tire by means of the tire inflation system.

In particular, the continuous compensation of the pressure loss can be accomplished in such a manner that the monitoring unit initially calculates an increase in volume flow for accelerated restoration of a target value to be maintained for the internal tire pressure and introduces the volume flow into the at least one vehicle tire by means of the tire inflation system. Thereafter the introduction is continued uninterruptedly with a suitable lower volume flow for maintaining the restored internal tire pressure. For the sake of simplicity, the volume flow can also be fixedly selected in advance in such a manner that, after identification of the tire defect or the leakage caused thereby, at least a further loss of pressure is counteracted.

In other words, there is a continuous compensation of the loss of pressure for as long as the leakage exists, so that the accustomed driving behavior of the utility vehicle can be maintained during the return-home mode. This allows a safe return home or to a shop.

Use of the system for tire pressure monitoring is possible not only in multi-wheel utility vehicles such as agricultural tractors or the like, but also in the field of attached or add-on agricultural implements insofar as they have support, guide or drive wheels of their own.

The monitoring unit can determine whether compensation of the pressure loss is even possible in view of the available inflation capacity of the tire inflation system, wherein the monitoring unit causes output of an action recommendation dependent on the determination result. In this manner, further information can be provided to the driver of the utility vehicle which allows him or her to assess whether and, if applicable, the extent to which further travel is advisable despite the tire defect. In case there is sufficient inflation capacity, a recommendation can be made to the effect that, while travel can be continued with reduced speed, a repair shop should be consulted immediately. On the other hand, if the volume flow calculated by the monitoring unit exceeds the available inflation capacity of the tire inflation system or if the internal tire pressure continues to drop, the recommendation can be for an immediate shutdown of the utility vehicle. To counteract damage to the at least one vehicle tire or the occurrence of unstable driving conditions, it can further be provided that the monitoring unit transmits a control command for limiting travel speed to an engine control unit present in the utility vehicle.

There is also the possibility that the tire pressure monitoring performed by the monitoring unit can have multiple escalation stages preceding the return-home mode. These are used especially for a preliminary decision as to whether a loss of pressure appearing in at least one vehicle tire is based on a defect or whether it indicates a creeping reduction of the internal tire pressure due to continually increasing minor leaks in the region of the tire casing or the transition to the adjoining rim.

In this case, it is possible for the control unit to check in a first escalation stage as to whether the internal tire pressure of the at least one vehicle tire lies within a defined tolerance range in order to produce driver information indicating a reduced internal tire pressure in the case of an impermissible deviation or to initiate a correction of the internal tire pressure by activating the tire inflation system. The tolerance range results from the target value to be maintained for the internal tire pressure. The target value is defined by the driver or a driver assistance system in the commercial vehicle, for instance. In the latter case, the definition is based particularly on position information from a GPS navigation system, specifically by taking into consideration the conditions of the ground being driven on in each case and the current operating state of the utility vehicle.

It is also conceivable for the monitoring unit to check in a second escalation stage for the at least one vehicle tire as to whether the internal tire pressure has again dropped despite the correction carried out in the first escalation stage, in order to initiate the output of driver information indicating a tire defect. The introduction of different escalation stages enables a reliable differentiation of the reasons responsible for the loss of pressure and the corresponding instruction to the driver.

In the case of a multi-wheel utility vehicle, the driver information can additionally include information on the position of the affected vehicle tire.

The monitoring unit can determine the progression over time of the defect-induced loss of pressure, and in one example only after passing through the two escalation stages so that the danger of an erroneous activation of the return-home mode is largely excluded.

The action recommendation or the driver information can be issued, for example, via a graphical user interface communicating with the monitoring unit. This interface is typically designed as a touch-sensitive video screen and has a data exchange connection to the monitoring unit via a CAN bus. The action recommendation or the driver information per se is issued in particular in the form of plain text notifications. To increase attentiveness, this can be additionally executed with acoustic signals that are produced by means of a signal generator associated with the graphical user interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
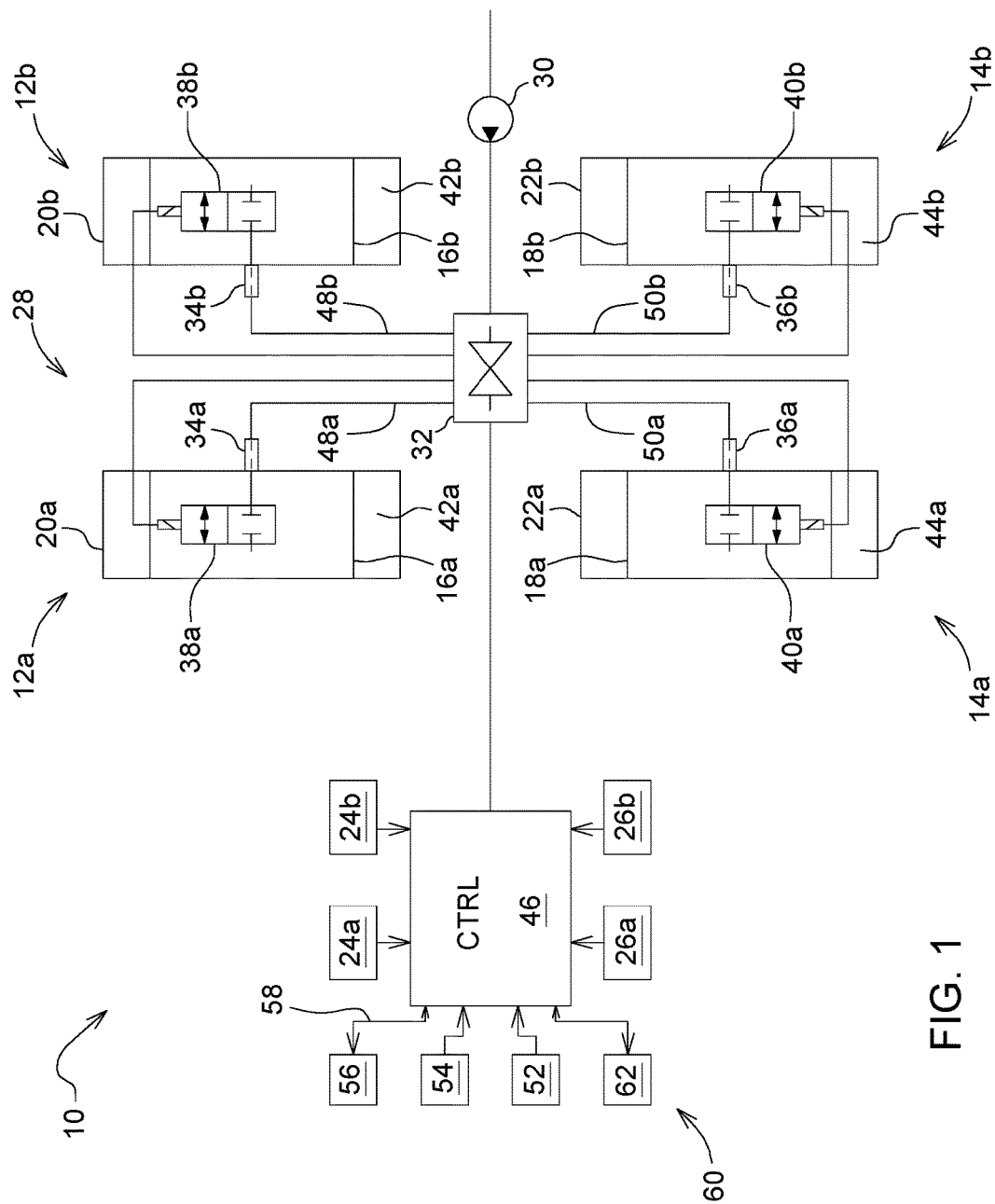
FIG. 1 illustrates a block schematic diagram of one embodiment of a system for tire pressure monitoring for a utility vehicle.

In a first embodiment of this disclosure, a system 10 for tire pressure monitoring for a utility vehicle (such as an agricultural tractor) includes left and right front wheels 12a, 12b as well as left and right rear wheels 14a, 14b. Each of the front and rear wheels 12a, 12b, 14a, 14b has a rim 16a, 16b, 18a, 18b and a vehicle tire 20a, 20b, 22a, 22b mounted on the rim 16a, 16b, 18a, 18b. A pressure sensor 24a, 24b, 26a, 26b for detecting a respective internal tire pressure is associated with each of the vehicle tires 20a, 20b, 22a, 22b.

An electrically controllable tire inflation system 28 allows wheel-specific variation of the internal tire pressure. For this purpose, the tire inflation system 28 has a central control valve arrangement 32 fed from an air compressor 30 and connected to the vehicle tires 20a, 20b, 22a, 22b via respective rotary unions 34a, 34b, 36a, 36b and downstream wheel valves 38a, 38b, 40a, 40b, in order to allow a targeted adjustment of the internal tire pressure inside an internal tire chamber 42a, 42b, 44a, 44b formed by the vehicle tires 20a, 20b, 22a, 22b.

The system 10 further includes a microprocessor-controlled monitoring unit 46, which communicates with the pressure sensors 24a, 24b, 26a, 26b and the tire inflation system 28. Together with the pressure sensors 24a, 24b, 26a, 26b, the monitoring unit 46 and the tire inflation system 28 form a control loop for a target value for the internal tire pressure that is to be maintained.

The pressure sensors 24a, 24b, 26a, 26b can be embedded in a tire casing of the respective vehicle tire 20a, 20b, 22a, 22b and connected via a wireless data link to the monitoring unit 46. In the embodiment of FIG. 1, however, a wired communication may be desirable such that the pressure sensors 24a, 24b, 26a, 26b are fixedly mounted on the vehicle in order to detect the pressure conditions prevailing between the central control valve arrangement 32 and the rotary unions 34a, 34b, 36a, 36b in associated supply lines 48a, 48b, 50a, 50b. The wheel valves 38a, 38b, 40a, 40b are closed in the inactive state and thus they are briefly opened by the monitoring unit 46 in order to measure the internal tire pressure so that the internal tire pressure to be measured is present in the respective supply line 48a, 48b, 50a, 50b. Differing from this, an individual pressure sensor (not shown) can be housed in the central control valve arrangement 32, wherein the internal tire pressure to be measured is sequentially applied to this pressure sensor by successive opening of the wheel valves 38a, 38b, 40a, 40b.

In addition, the monitoring unit 46 is connected to an acoustic signal generator 52 and an engine control device 54 for influencing the operating state of a drive engine included in the agricultural tractor. The drive engine may be a diesel engine.

The driver defines the target value of the internal tire pressure via a graphical user interface 56 communicating with the monitoring unit 46 and may be a touch-sensitive video screen that has a data exchange connection to the monitoring unit 46 via a CAN bus 58. The target value for the internal tire pressure can optionally be defined by a driver assistance system 60 present in the utility vehicle, in more precise terms, determined based on position information from a GPS navigation system 62, taking into account specifications of the agricultural tractor stored in the monitoring unit 46 and specifications of the vehicle tires 20a, 20b, 22a, 22b in use. As such, the internal tire pressure can be automatically adapted corresponding to the conditions of the ground being driven on and the current operating state of the agricultural tractor (transport driving on a road, tilling a field with an attached or add-on agricultural implement, traveling on an unpaved work road and the like).

Based on the different axle loads appearing on the front and rear wheels 12a, 12b, 14a, 14b or the use of different sized front and rear wheels, the monitoring unit 46 calculates individual target values for the internal tire pressure for the front and rear wheels 12a, 12b, 14a, 14b, proceeding from the driver's specification or the driver assistance requirement.

It should be noted that the representation of a utility vehicle designed as an agricultural tractor is only one such example. In other embodiments, the vehicle can be an attached or add-on agricultural implement that can be mounted on an agricultural tractor insofar as the implement has air-filled support, guide or drive wheels of its own.

Figure 2:
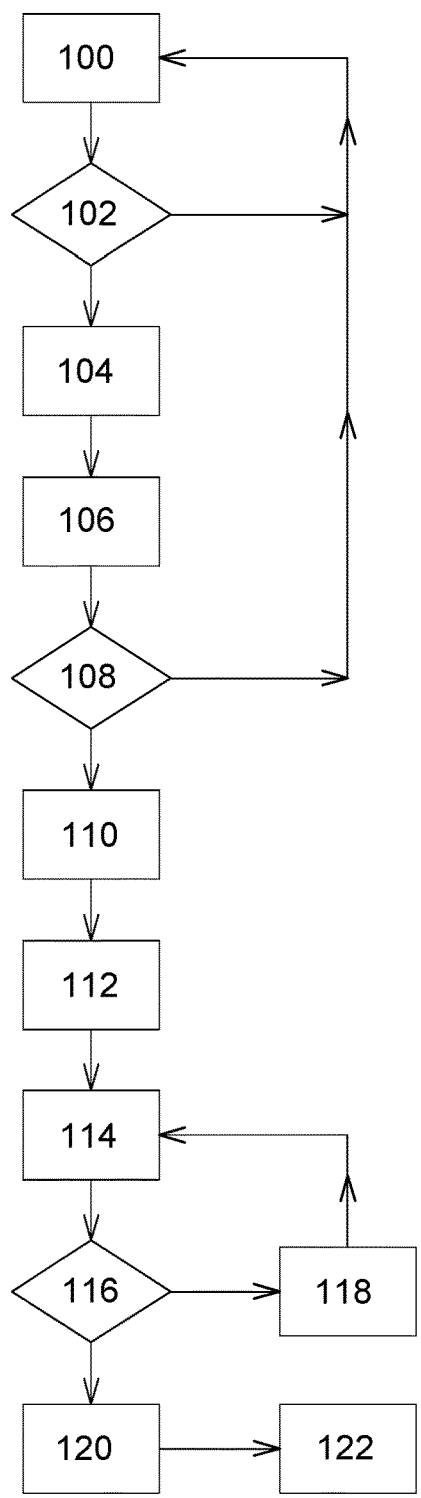
FIG. 2 illustrates a flow chart for illustrating the mode of operation of the system of FIG. 1.

Referring to FIG. 2, a flow chart illustrates one embodiment of a mode of operation of the system 10 shown in FIG. 1. The mode of operation may be a control process formed by a plurality of steps. In a first step 100, for example, the monitoring unit 46 queries the internal tire pressure detected wheel-specifically for each of the vehicle tires 20a, 20b, 22a, 22b by means of the pressure sensors 24a, 24b, 26a, 26b. In a subsequent separate step 102, the monitoring unit 46 checks whether the detected internal tire pressure lies within a tolerance range specified by the target value to be maintained. If this check shows an impermissible deviation, the monitoring unit 46 advances to a third step 104 by initiating driver information indicating a lowered internal tire pressure as part of the first escalation stage by activating the graphical user interface 56.

In a fourth step 106, the monitoring unit 46 initiates a correction of the internal tire pressure by activating the tire inflation system 28. At the same time, the vehicle information contains data regarding the positions of all affected vehicle tires 20a, 20b, 22a, 22b. If the result in the second step 102 shows that the specified tolerance range is being maintained by the detected internal tire pressure, however, the monitoring unit 46 returns immediately to the first step 100.

The success of the pressure correction carried out in the fourth step 106 is checked by the monitoring unit 46 in a fifth step 108 by again querying the respective internal tire pressure detected by the pressure sensors 24a, 24b, 26a, 26b. If another decrease of the internal tire pressure in the affected vehicle tire or tires 20a, 20b, 22a, 22b is the result, then the monitoring unit 46 assumes a defect and continues with a sixth step 110. In this step, the monitoring unit 46 initiates, by activating the user interface 56 as part of a second escalation stage, the output of driver information indicating a possible tire defect, including another indication of the position of all affected vehicle tires 20a, 20b, 22a, 22b. Otherwise the control unit 46 immediately returns to the first step 100.

In a seventh step 112, i.e., after passing through the two above-mentioned escalation stages, the control unit 46 determines a temporal progression of the detected defect-induced pressure loss in a return-home mode. Based on the determined temporal progression, the monitoring unit 46 calculates a volume flow necessary for continuous compensation of the pressure loss for each affected vehicle tire 20a, 20b, 22a, 22b and introduces the volume flow by means of the tire inflation system 28.

The monitoring unit 46 accomplishes the continuous compensation of the pressure loss in an eighth step 114 by first calculating an increased volume flow for accelerated restoration of the target value to be maintained for the internal tire pressure and introducing the volume flow by means of the tire inflation system 28. Thereafter the introduction is continued uninterruptedly with a suitable lower volume flow for maintaining the restored internal tire pressure. For the sake of simplicity, the volume flow can also be fixedly selected in advance in such a manner that, after identification of the tire defect or the leakage caused thereby, at least a further loss of pressure is counteracted.

In other words, there is a continuous compensation of the loss of pressure for as long as the leakage exists, so that the accustomed driving behavior of the agricultural tractor can be maintained during the return-home mode. This allows a safe return home or to a shop.

In a subsequent ninth step 116, the monitoring unit 46 determines whether compensation of the pressure loss is even possible in view of the available inflation capacity of the tire inflation system 28, wherein the monitoring unit 46 causes output of an action recommendation dependent on the determination result by activating the graphical interface 56.

In case there is sufficient inflation capacity, an action recommendation is made in a tenth step 118 to the effect that, while travel can be continued with reduced speed, a repair shop should be consulted immediately. Thereafter the control unit 46 returns to the eighth step 114.

On the other hand, if the result of an eleventh step 120 is that the volume flow calculated by the monitoring unit 46 in the seventh step 112 exceeds the available inflation capacity of the tire inflation system 28 or the internal tire pressure continues to decrease, a twelfth step 122 recommends an immediate shutdown of the agricultural tractor. To avoid damage to the affected vehicle tires 20a, 20b, 22a, 22b and to counteract the occurrence of unstable driving states, the monitoring unit 46 also transmits a control command for travel speed limitation to the engine control unit 54.

The action recommendations or the driver information messages per se are issued in the form of plain text notifications. To increase attentiveness, the message is additionally communicated with acoustic signals that are produced by means of a signal generator 52 associated with the graphical user interface 56.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for tire pressure monitoring at least one vehicle tire of a utility vehicle, comprising:
    a pressure sensor for detecting an internal tire pressure of the at least one vehicle tire;
    an electrically controllable tire inflation system for varying the internal tire pressure; and
    a monitoring unit disposed in communication with the pressure sensor and the tire inflation system, wherein the monitoring unit operably identifies a defect-induced loss of pressure in the at least one vehicle tire based on the detected internal tire pressure;
    wherein the monitoring unit operably determines a temporal progression of the detected defect-induced loss of pressure;
    wherein the monitoring unit operably calculates a volume flow necessary for continuous compensation of the pressure loss based on the temporal progression;
    wherein the monitoring unit operably controls the volume flow into the at least one vehicle tire via the tire inflation system;
    wherein the monitoring unit determines the temporal progression of the defect-induced loss of pressure after passing through a first escalation stage and a second escalation stage;
    wherein the monitoring unit determines that the at least one vehicle tire is defective in response to the progression; and
    wherein after passing through the first and second escalation stages of the defect-induced loss of pressure, the continuous compensation of the pressure loss includes an increased volume flow for accelerated restoration of internal tire pressure followed by a lower volume flow to maintain the internal tire pressure.

2. The system of claim 1, wherein:
the monitoring unit operably determines whether compensation of the pressure loss is possible in view of an available inflation capacity of the tire inflation system; and
the monitoring unit initiates an output of an action recommendation dependent on whether compensation of the pressure loss is possible in view of the available inflation capacity of the tire inflation system.

3. The system of claim 1, wherein the first and second escalation stages precede a return-home mode.

4. The system of claim 3, wherein a control unit executes the first escalation stage to determine whether the internal tire pressure of the at least one vehicle tire is within a defined tolerance range in order to initiate a correction of the internal tire pressure by activating the tire inflation system.

5. The system of claim 4, wherein the monitoring unit executes the second escalation stage to check the at least one vehicle tire as to whether the internal tire pressure has again dropped despite the correction executed in the first escalation stage, and further initiates an output of driver information indicating a tire defect.

6. The system of claim 1, wherein an action recommendation or driver information is communicated via a graphical user interface disposed in communication with the monitoring unit.

7. A utility vehicle, comprising:
at least one vehicle tire having an internal tire pressure; and
a system for monitoring tire pressure, the system comprising:
a pressure sensor for detecting an internal tire pressure of the at least one vehicle tire;
an electrically controllable tire inflation system for varying the internal tire pressure; and
a monitoring unit disposed in communication with the pressure sensor and the tire inflation system, wherein the monitoring unit operably identifies a defect-induced loss of pressure in the at least one vehicle tire based on the detected internal tire pressure;
wherein the monitoring unit operably determines a temporal progression of the detected defect-induced loss of pressure;
wherein the monitoring unit operably calculates a volume flow necessary for continuous compensation of the pressure loss based on the temporal progression;
wherein the monitoring unit operably controls the volume flow into the at least one vehicle tire via the tire inflation system;
wherein the monitoring unit determines the temporal progression over time of the defect-induced loss of pressure after passing through a first escalation stage and a second escalation stage;
wherein the monitoring unit determines that the at least one vehicle tire is defective in response to the progression; and
wherein after passing through the first and second escalation stages of the defect-induced loss of pressure, the continuous compensation of the pressure loss includes an increased volume flow for an accelerated restoration of internal tire pressure followed by a lower volume flow to maintain the internal tire pressure.

* * * * *